(No Model.) 3 Sheets—Sheet 1.
R. CORSCADEN.
APPARATUS FOR COLLECTING AND DRYING SEDIMENTARY MATTER OF SEWAGE.
No. 331,943. Patented Dec. 8, 1885.
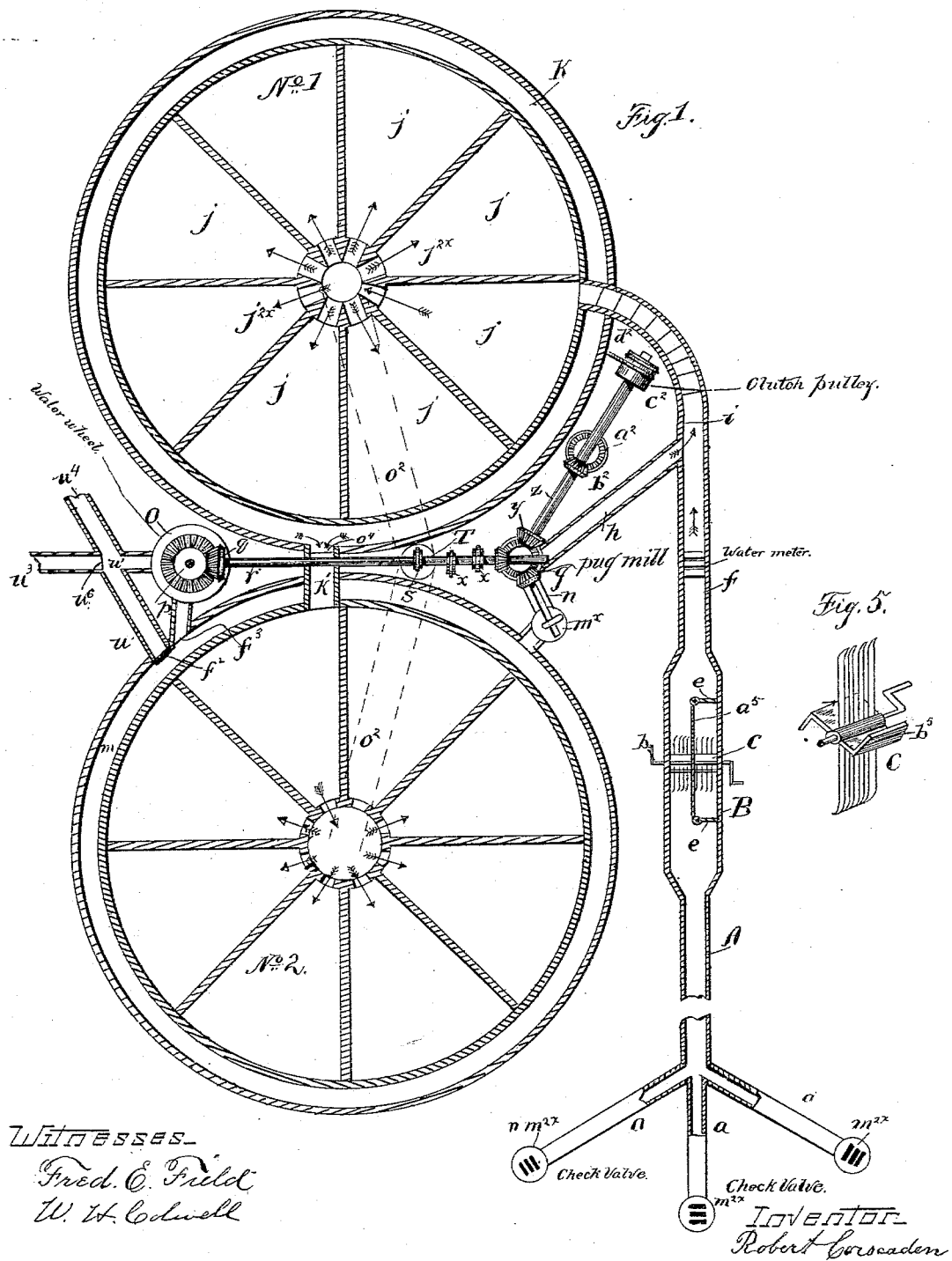

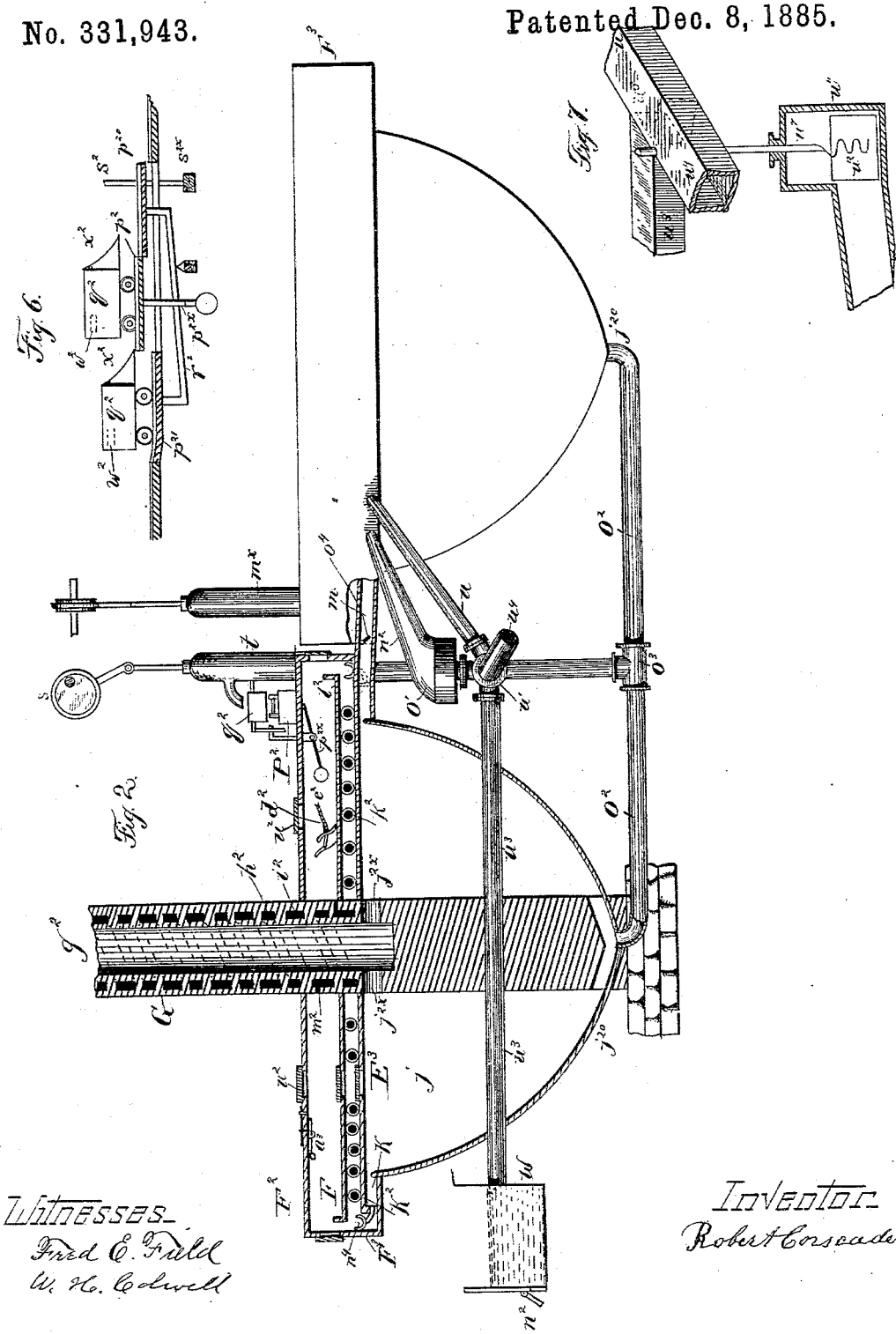

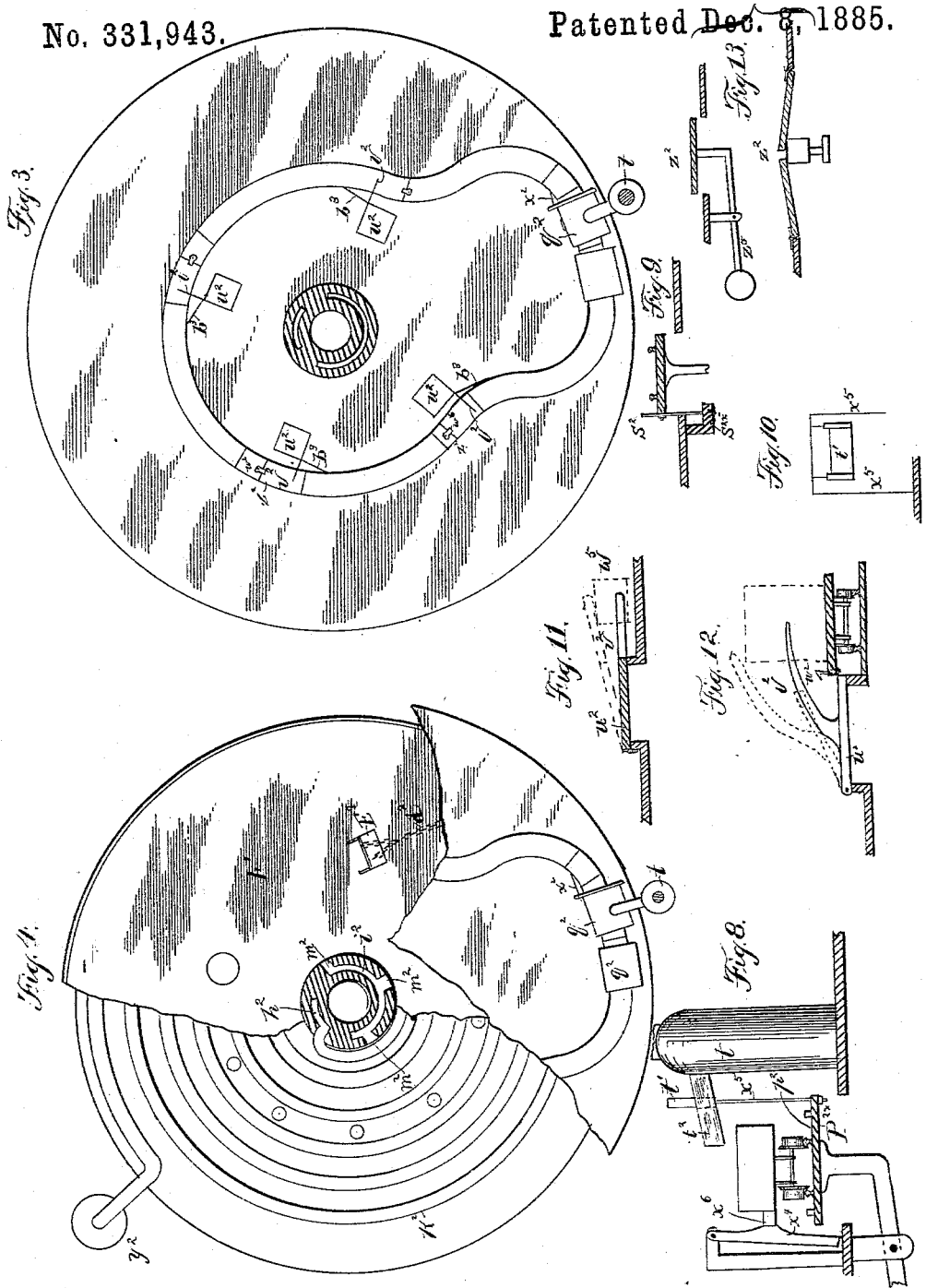

United States Patent Office.

ROBERT CORSCADEN, OF PROVIDENCE, RHODE ISLAND.

APPARATUS FOR COLLECTING AND DRYING SEDIMENTARY MATTER OF SEWAGE.

SPECIFICATION forming part of Letters Patent No. 331,943, dated December 8, 1885.

Application filed March 31, 1884. Serial No. 126,250. (No model.)

*To all whom it may concern:*

Be it known that I, ROBERT CORSCADEN, a citizen of the United States, residing at Providence, in the county of Providence and State of Rhode Island, have invented a new and useful Improvement in Apparatus for Collecting and Drying Sedimentary Matter of Sewage, of which the following is a specification.

My invention relates to improvements in apparatus for collecting and drying sedimentary matter of sewage and freeing the sewers of gas and foul air; and it consists in certain improvements upon the apparatus for the same purpose for which I made application October 4, 1883, No. 108,138, constituting therewith an apparatus which I have denominated "The National Sewage and Fertilizer System," which said improvements are hereinafter fully described, in connection with the accompanying drawings and claims.

In the drawings, Figure 1 is a plan view, partly in section, illustrating a plant comprising certain of my said improvements. Fig. 2 is an elevation, one series of tanks and its connections being shown in vertical section. Fig. 3 is a plan view of the devices for handling and transporting the material. Fig. 4 is a broken plan view showing the heating-pipe, the drying-floor, the covering-floor, and apparatus thereon. Fig. 5 is a detail view of a revolving screen for purposes to be described. Figs. 6 to 13 are detail views of operating devices.

A represents a main sewer, $a$ $a$ $a$ being its tributaries. Near the place where the main sewer delivers its discharge to my apparatus, I introduce into it a parallel wall or walls, $a^5$, dividing it into two or more parallel passages. A gate, $e$, is provided in connection with this wall at each end thereof, such that while one passage is closed the other may be open. Rubbish of all sorts finds its way into and through the sewers, and to remove such as cannot be reduced to a condition suitable for agricultural purposes I introduce into the above-named passages screens by which it may be arrested to be withdrawn from the sewer. I have shown in Figs. 1 and 5 a form of such screen $b$, adapted to be revolved to both arrest and raise any clogging or intractable materials, the same when raised falling upon the trough $b^5$, whence it is easily removed. One of such screens being arranged in each passage, it is apparent that one passage being left open for the passage of sewage, the other, the gates being shifted to close it, can be freed from all such obnoxious matter, so that at least one passage can be always kept clear to turn the sewage through when the other or others become clogged. Between this device and the settling tanks or basins I may introduce into the sewer a meter, $f$, of any suitable known construction, to properly gage and register the amount of sewage passing. I also arrange in the sewer near its entrance to the basins bars or projections transversely to the flow of the sewage, to agitate and mix the same and render it of uniform consistency before entering the basins.

In my present arrangement of catch-basins or settling-tanks $j$ they are sector-shaped and radially arranged about a common center and are built with walls inclining downward to the common center or lowest part, all as in my former application above referred to; but in my present device I distribute the sewage to them all from one, into which the sewer delivers and through which the sewage passes to the lowest part of the flue $g^2$ of the chimney G, whence it is distributed through the openings $j^{2\times}$ to the other tanks $j$. In these tanks the heavy and sedimentary matter in the sewage settles to the bottom, lying there in a semi-liquid or "sludge" form, while the lighter liquid overflows into the circular drain $k$, which surrounds the basins, whence, if desired, it may flow off by a discharge-sewer. I contemplate a further use of it, however. Where the flow of sewage is large and heavy, a single settling and precipitation will not be sufficient. I accordingly conduct the overflow from the first series of tanks to a second series by a duct, $k'$, in which second series, constructed substantially like the first, the process is repeated. A check-valve, $o^4$, is arranged in the duct $k'$ to automatically check any backflow from the second series of tanks to the first. The overflow from this second series will be comparatively clear and innocuous and will collect and pass off by the circular drain $m$, surrounding the catch-basins; or, if desired, the process may be still further repeated in yet another series of basins.

To further remove from the sediment or sludge its liquid, I have devised the following apparatus: From the bottom of a series of tanks I build a pier, which as it emerges from the tanks takes the form of a tall chimney, G. At a point a little below the level of the brim of the tanks the central flue, $g^2$, of said chimney begins. At this level, also, the wall of the flue is pierced with the openings $j^{2\times}$ for the distribution of the sewage from the tank which receives it from the sewer to the others. Above these openings, and also a little above the brim of the basins, I build a floor, $E^3$, entirely covering the basins. Upon this floor I arrange a circulating pipe or flue, $k^2$, connecting at one end with a furnace, $y^2$, and at the other with a smaller flue, $h^2$, of the chimney. I have shown this flue as a spiral one formed in the wall of the chimney, though it may be differently disposed. Above the circulating-pipe I arrange another floor, F, with a rim about its margin to receive the sludge raised from the tanks. The object of this construction is to heat the floor F by the furnace and circulating-pipe for the purpose of evaporating the liquid from the sludge. The surplus heat, passing up the spiral flue, heats the chimney, causing a strong upward draft in the central flue, which draws off and upward all gases and effluvias rising from the basins or entering thereinto from the sewer. Above the heating-floor a covering-floor, $F^2$, is arranged and entirely around the apparatus an inclosing-wall, $F^3$, connecting the last-named floor with the outer part of the circular drain, whereby a close heating-chamber is formed to evaporate the liquid from the sludge. Still another flue, $i^2$, may be formed in or around the chimney, communicating with the heating-chamber by openings $m^2$, whereby the steam and heated fumes arising in the heating or drying chamber may be drawn off, the same aiding still further to heat the chimney and intensify the draft up the central flue. It will thus be seen that the apparatus so far is entirely inclosed, and that the currents of air entering the basins above the sewage and passing up the central flue must be drawn through the sewer, and to that extent will operate to draw the sewer-gases and effluvias from the gullies and inlets toward the discharge end of the sewer, and by arranging at the said inlets graduated valves or gratings $m^{2\times}$, to control the admission of the air, this device may be made to effect a steady movement of the sewer-air down toward the discharge.

Around and below the margin of the heating-floor may be arranged a gutter or drain, $n^4$, to catch any overflow from the drying-floor and conduct it again to the basins.

A chimney, furnace, pipe, and drying-floor may be built in connection with each series of basins, if found necessary, though I have shown but one drying apparatus for two series of basins.

I transfer the sludge from the basins to the drying-floor in the following manner: At the angular bottom of each basin a channel is formed in the pier, and all of the said channels converge to and unite in a discharge-pipe, $o^2$, and the several discharge-pipes converge into a union, $o^3$, with which also connects with the suction-pipe of a pump, $t$, which discharges into apparatus to be described hereinafter.

In order to deodorize the sewage, more conveniently handle the material, and utilize the clarified liquid, I have devised the following: The discharge from the circular overflow-drain of the second series may be from either of two outlets, $f^2 f^3$, adjacent to each other and fitted with a gate adapted to close one when the other is open. The discharge $u$ leads to a union, $u'$, where, by means of an automatic gate, $u^6$, operated by a float, the effluent may be directed along a drain, $u^3$, to a reservoir, $w$, or by drain $u^4$ to a river or bay. If the final discharge is to be into tide-water, and high-water mark is above the level of the union $u'$, it becomes necessary to provide reservoir $w$, into which to discharge the effluent during the last of flood and first of ebb tide, the reservoir being provided with tide-valve $n^2$, to prevent backflow of tide-water into the reservoir, and to permit free discharge therefrom when tide-water is below it. When tide-water is below the level of the union $u'$, the effluent may be discharged directly through $u^4$ into the bay; but the float of the automatic valve $v$ being so arranged as to be acted on by the rising and falling tide when the tide rises too high to permit discharge through $u^4$, the rise of the float causes the gate $v$ to shift and close $u^4$ and open the channel $u^3$ to the reservoir. The automatic valve $v$ may be of any approved construction.

I have shown in Fig. 7 a construction suitable to be employed, in which the channels $u^3 u^4$ are opened or closed by a single horizontally-swinging gate, $u^6$, operated by a stem, $u^7$, extending downward into a vertical channel or well, $u^{11}$, communicating with tide-water. The float $u^{12}$ plays up and down by the action of the tide in the well, and acts upon a spiral formed in the stem $u^7$ to rotate the stem sufficiently to set the valve or gate $u^6$ to close $u^3$ and open $u^4$, or the converse, according to the position of the float.

The gate to open or close channels $f^2 f^3$ may be similar to either of those thus described or of any approved structure having the same operation, except that it is to be operated by hand. The gates $e$ in the sewer may be similarly constructed. The purpose of channels $f^2 f^3$ is to be able to discharge the drainage from drain $m$, either directly away, as above described, or to turn it into the flume of a turbine wheel $o$ to furnish power for the operations to be next described. A gear, $p$, on the turbine shaft meshes with a pinion, $q$, on the shaft $r'$, carrying an eccentric, $s$, which works the pump $t$ to raise the sludge from the basins.

Eccentrics $x\ x$ on the same shaft may operate crushers to pulverize chemicals, which may be dissolved in the pug-mill $g$, operated by gearing from the same shaft, and discharged by a conduit, $h$, into the main sewer to deodorize the sewage. The gearing of the pug-mill operates shaft $n$ and pump $m^\times$ to supply the pug-mill with liquid from drain $m$, also shaft $z$ to drive a mill, $b^2$, to grind and pulverize the dried sludge, and a clutch-pulley, $c^2$, which by a rope, $d^2$, operates a shovel or scraper, $e^2$, to remove said dried sludge from the drying-floor.

For convenience in depositing the sludge upon the drying-floor, I have devised the following: Under the discharge of the pump $t$ is a rising and falling platform, $p^2$, supported upon a lever, $p^{2\times}$, whose counterbalance outweighs the unloaded car, but is less than the weight of the car loaded. The grade of the track on this platform is slightly downward, so that when the platform sinks by the weight of the loaded car, and is engaged by a catch, $x^4$, Fig. 8, to hold it down, it connects with a second rising and falling platform, $p^{20}$, next in advance of it, supported upon one end of a tilting lever, $r^2$. When the car has gotten entirely upon this second platform, it strikes the upper end of a yielding prop, $s^2$, Figs. 6 and 9, which is pivoted to the platform, and has hitherto held the platform up, removing said prop from its support $s^{2\times}$, and permitting the platform to fall to the level of the permanent track. The fall of this platform elevates a third platform, $p^{21}$, supported upon the other end of the tilting lever $r^2$, and by reason of the inequality of the length of the arms of the lever said platform raises an empty car, which has rolled down upon it from the other end of the circular fixed track to the height of the first-mentioned platform $p^2$. The said empty car, now moving forward upon platform $p^2$, disengages by a projection, $x^6$, the catch which held it down, and platform and car rise to receive their load from the pump. The rise and fall of this platform works by rod $x^5$ a gate, $t'$, to open and close the discharge $t^2$ of the pump. Said gate and operating devices are shown in Figs. 8 and 10. The loaded car upon leaving the platform $p^{20}$ passes along the track until the inclined part and nose $x^2$ upon its forward end engages under a bar, $v^2$, Figs. 3, 11, and 12, which is secured to a hinged cover, $u^2$, of an opening to the drying-chamber, lifting such cover preparatory to the dumping of the load. The rising of the said cover strikes a latch, $w^2$, Fig. 12, releasing the hinged side of the cover, and permitting the load to slide down through the opening into the drying-chamber. A laterally-inclined rail or bar, $b^3$, is fixed beside the track, which, as the car moves on, impinges against the released side of the car and closes it back into its place, the latch dropping again into its place.

At $z^2$, I have shown a jointed rising and falling section of track, which is overbalanced by the lever and weight $z^5$, whereby it is kept normally in a raised position. This section is arranged in the proper relation to the openings and covers $u^2$ to effect this result, that when an advancing loaded car comes upon the raised section its superior weight depresses it and at the same time the car is stopped. When this shall have taken place, the nose $x^2$, bar $v^2$, and latch $w^5$ will have acted and the load will be discharged through the opening. The car and section thus lightened are raised by the overweight, the nose $x^2$ escapes from the bar $v^2$, whose length is adjusted to that result, and the car starts down the incline upon its return to the pump. If for any reason it is desired to detain the car upon the section or to keep the section in a depressed position, this may be done by means of a simple catch or button, $w^6$, projecting upward from the sill below.

The advantages of my invention are clearly apparent. Cities are enabled to utilize the manurial parts of the sewage. The process clarifies the effluent which is discharged into the river or bay. The odors of the sewers are drawn from the gullies and inlets to the chimney, and with the sewer-gas are discharged into the upper air.

Having thus described my invention, what I claim, and desire to secure by Letters Patent, is—

1. The combination, with devices for settling, drying, and reducing the sedimentary matter of sewage, of the sewer divided by one or more parallel walls into two or more passages, said passages merging again into the sewer, gates governing the flow of the sewage therethrough, and screens for separating intractable matter from the sewage, as set forth.

2. The combination, with the sewer, of the revolving screen $b$, as set forth.

3. The screen $b$, having the discharging-troughs $b^5$, as set forth.

4. The series of sector-formed settling-tanks, in combination with the central distributing-channel and the sewer, as set forth.

5. The combination of the radially-arranged settling-tanks, the pier, the radial ducts, and the sludge-ducts $o^2$, as set forth.

6. The combination of two or more series of radially-arranged catch-basins, ducts converging therefrom to the sludge-ducts $o^2$, the latter converging also to a connection with the pump, as set forth.

7. The combination of the radially-arranged settling-tanks, distributing-channels from one thereof to all the rest, and the circular effluent-drain surrounding the series, as set forth.

8. The effluent-drain $m$, provided with two adjacent discharges, and a gate adapted to open one and close the other, as desired, as set forth.

9. In an apparatus for treating sewage and discharging its effluent into tide-water, the combination, with the union $u'$, the reservoir and its connecting-pipe, and the pipe discharging to the bay, of the gate and its actuating-float to open one of said pipes and close the other, according to the state of the tide, substantially as set forth.

10. In an apparatus for treating sewage, the combination, with the effluent-drain $m$, of the water-wheel, the gearing and shafts connected therewith, the pumps, the mills, and the clutch-pulley, substantially as set forth.

11. The combination, with the covering-floor provided with openings and covers therefor, of the bars $r^2$, attached to said covers, the track running adjacent to said openings, the fixed inclined bars $b^3$, and the car having the nose $x^2$ and the latch $w^5$, substantially as described.

12. The combination of the pump and the car, of the overbalanced platform $p^2$ and holding devices, substantially as set forth.

13. The combination of the platforms $p^{20} \ p^{21}$, the tilting lever $r^2$, and the yielding prop, substantially as set forth.

14. The combination, with the track, of the overbalanced rising and falling section thereof, and the car, substantially as set forth.

15. The combination, with the settling-tanks of the sewer, a meter therein, and mixing devices, as set forth.

ROBERT CORSCADEN.

Witnesses:
FRED. E. FIELD,
FRANK K. ROGERS.